(12) United States Patent
Ponzio et al.

(10) Patent No.: US 8,424,792 B2
(45) Date of Patent: Apr. 23, 2013

(54) APPARATUS AND METHODS FOR WINDING WIRE COILS OF DYNAMOELECTRIC MACHINE CORES

(75) Inventors: Massimo Ponzio, Florence (IT); Gianfranco Stratico, Siena (IT)

(73) Assignee: Atop S.p.A., Barberino Val d'Elsa (IT)

( * ) Notice: Subject to any disclaimer, the term of this patent is extended or adjusted under 35 U.S.C. 154(b) by 233 days.

(21) Appl. No.: 13/033,858

(22) Filed: Feb. 24, 2011

(65) Prior Publication Data

US 2011/0248113 A1 Oct. 13, 2011

Related U.S. Application Data

(63) Continuation of application No. 12/162,919, filed as application No. PCT/EP2007/002066 on Mar. 9, 2007, now abandoned.

(30) Foreign Application Priority Data

Mar. 13, 2006 (IT) ................. PI2006A0031

(51) Int. Cl.
*H02K 15/085* (2006.01)

(52) U.S. Cl.
USPC .............. 242/432.4; 242/432.3; 242/434

(58) Field of Classification Search ............ 242/432, 242/432.2, 432.3, 432.4, 432.5, 432.6, 434
See application file for complete search history.

(56) References Cited

U.S. PATENT DOCUMENTS

| | | |
|---|---|---|
| 2,445,937 A | 7/1948 | Carpenter |
| 2,573,976 A | 11/1951 | Linders |
| 3,253,792 A | 5/1966 | Brown et al. |
| 3,281,084 A | 10/1966 | Lill |
| 3,338,526 A | 8/1967 | Shaff et al. |
| 3,381,907 A | 5/1968 | Spanton, Jr. et al. |
| 4,762,283 A | 8/1988 | Sabatino |
| 5,860,615 A | 1/1999 | Burch |
| 6,098,912 A | 8/2000 | Noji |
| 6,533,208 B1 | 3/2003 | Becherucci et al. |
| 6,626,392 B2 | 9/2003 | Kajita |
| 6,749,144 B2 | 6/2004 | Komuro et al. |
| 6,976,650 B2 | 12/2005 | Becherucci et al. |
| 6,991,194 B2 | 1/2006 | Stratico et al. |
| 7,097,128 B2 | 8/2006 | Stratico et al. |
| 7,243,873 B2 | 7/2007 | Noji |
| 7,325,765 B2 | 2/2008 | Noji |
| 7,434,759 B2 | 10/2008 | Stratico et al. |

(Continued)

FOREIGN PATENT DOCUMENTS

EP 0 553 899 8/1993

*Primary Examiner* — Emmanuel M Marcelo

(74) *Attorney, Agent, or Firm* — Ropes & Gray LLP; Jeffrey H. Ingerman

(57) ABSTRACT

An apparatus and a method for winding wire coils in cores of dynamo electric machine using needles that are relatively movable with respect to the cores. Wire guides are provided that are also relatively movable with respect to the needle and the core so that the wire leaving the needle can be delivered to predetermined positions around the poles of the core to wind the wire coils. The wire guides are supported adjacent to the ends of the core by support means which have portions occupying positions of the needle trajectory during winding. The portion of the support means are movable as a function of the position occupied by the needle around the poles so that the needle can move without being obstructed. The arrangement enhances accuracy of guiding and positioning of the wire to form the wire coils and is suitable for compactly sized cores.

24 Claims, 14 Drawing Sheets

U.S. PATENT DOCUMENTS

| | | |
|---|---|---|
| 7,712,697 B1 | 5/2010 | Chamberlin et al. |
| 7,735,768 B2 | 6/2010 | Noji |
| 2003/0106954 A1 | 6/2003 | Stratico et al. |
| 2003/0168547 A1 | 9/2003 | Komuro et al. |
| 2005/0006518 A1 | 1/2005 | Becherucci et al. |
| 2006/0169822 A1 | 8/2006 | Noji |
| 2007/0181732 A1 | 8/2007 | Noji |
| 2009/0001209 A1 | 1/2009 | Ponzio et al. |
| 2009/0261194 A1 | 10/2009 | Naitou |

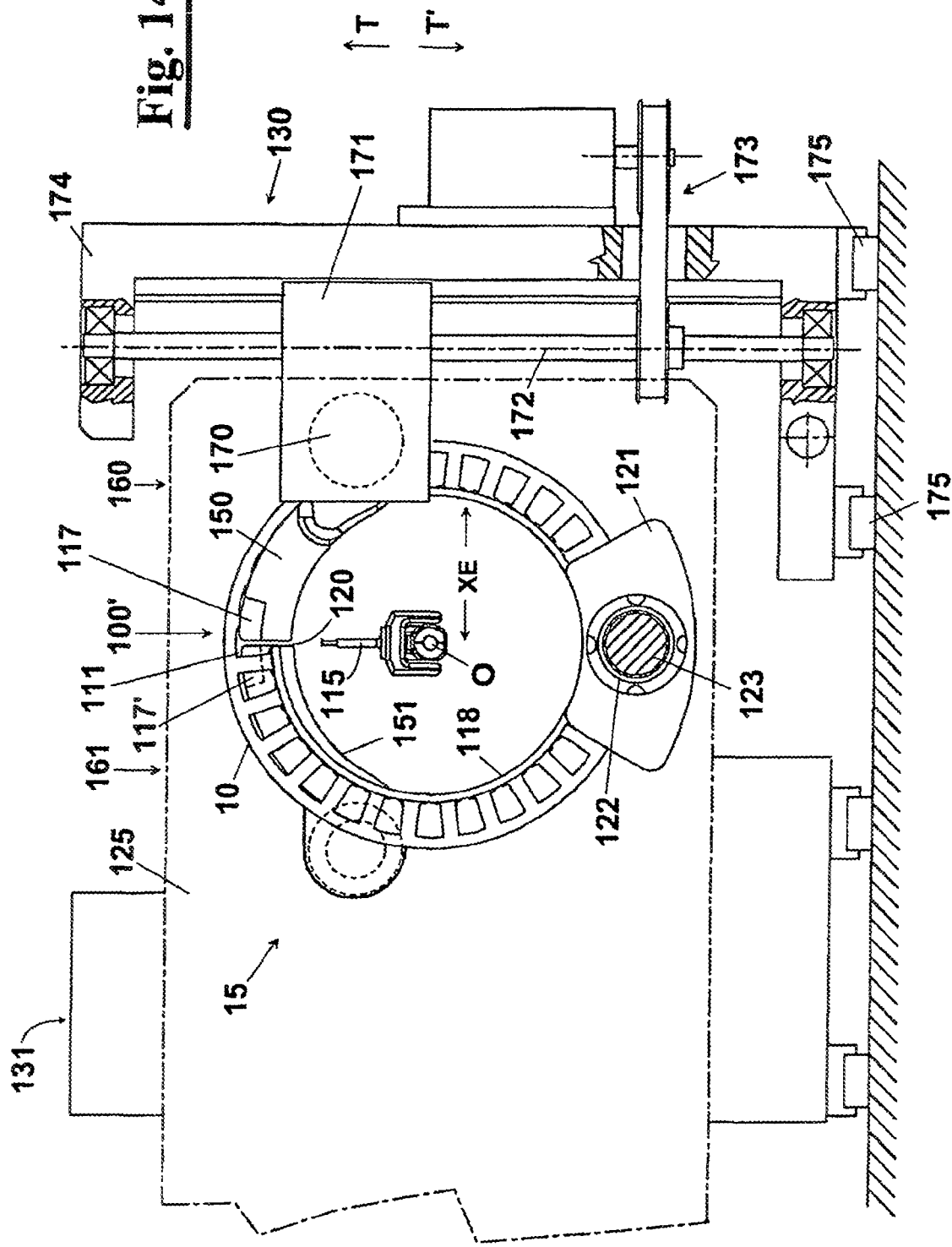

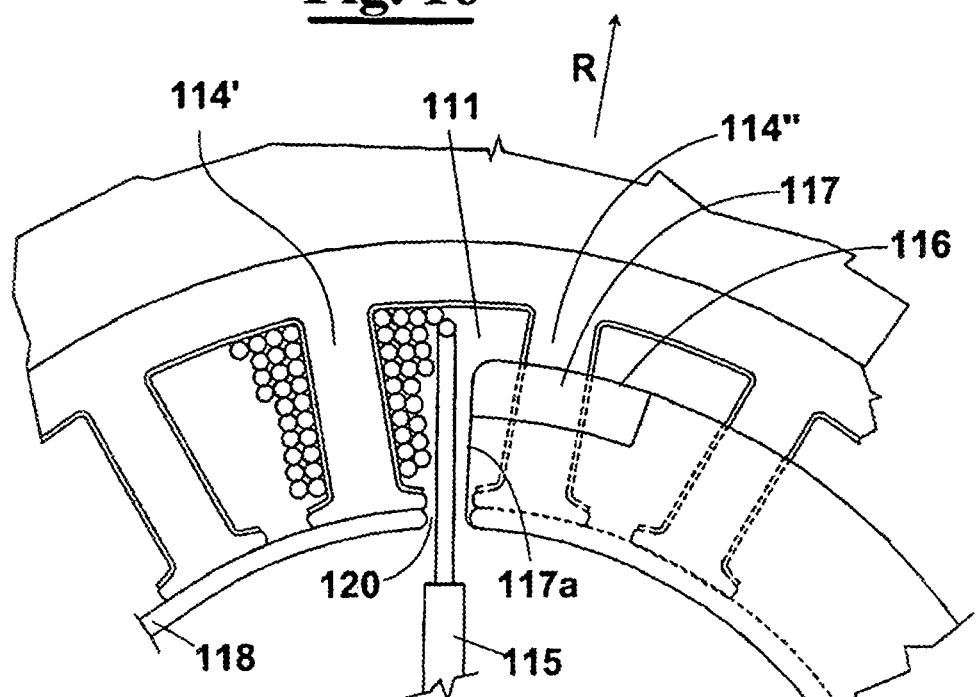
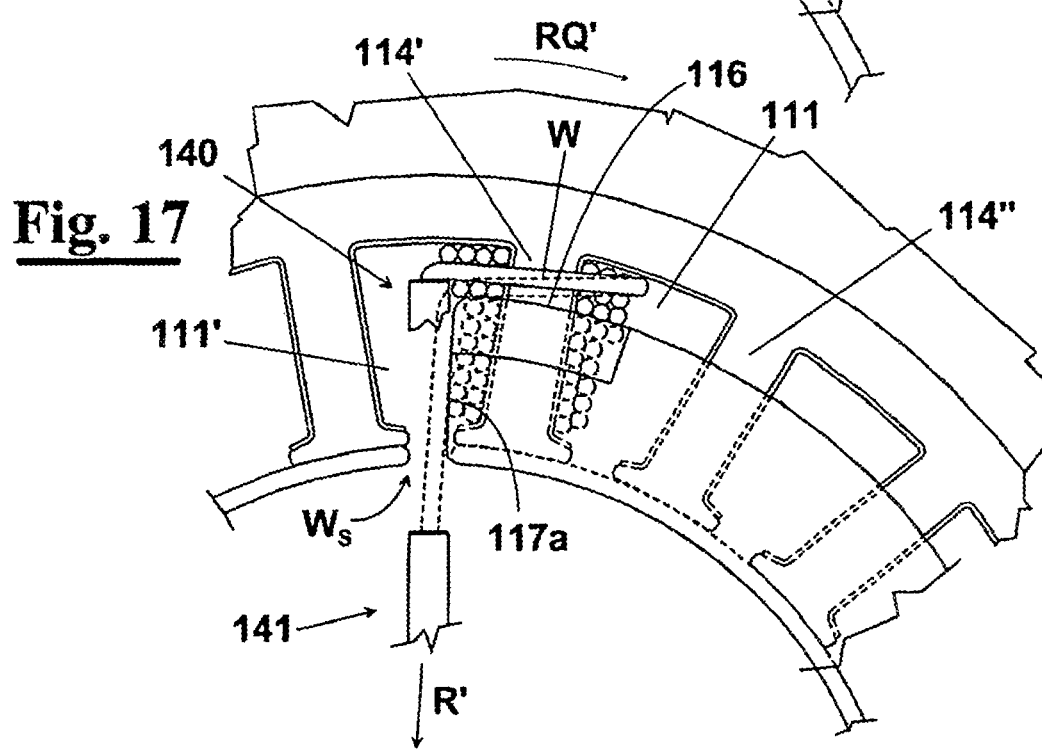

APPARATUS AND METHODS FOR WINDING WIRE COILS OF DYNAMOELECTRIC MACHINE CORES

CROSS REFERENCE TO RELATED APPLICATIONS

This is a continuation of U.S. patent application Ser. No. 12/162,919, filed Jul. 31, 2008 (now abandoned) as the United States National Stage of International Patent Application No. PCT/EP2007/002066, filed Mar. 9, 2007, each of which is hereby incorporated herein by reference in its respective entirety.

FIELD OF THE INVENTION

The present invention concerns winding wire coils of dynamoelectric machine cores and in particular it relates to depositing wire in slots by a wire dispensing needle having a relative motion with to respect to the core.

BACKGROUND OF THE INVENTION

Core slots have openings directed towards the center of a dynamo electric machine core, like the configuration of stators of DC Brushless motors. The wire coils consist of wire turns having portions positioned within the slots and across the end faces of the core. With such coil and core configurations, delivery of the wire from the needle occurs by causing repeated and sequential relative motions of translation, rotation and radial translation between the needle and the core.

Either the core or the needle can be moved to generate the relative motions. The relative translations are usually parallel to the center axis (O) of the core in order to form rectilinear portions of the wire coils, which are placed within the slots and beyond the ends of the core. The relative rotational motions are usually around the center of the core in order to form bridging portions between two wire coils that are placed across the end faces of the core. The relative radial translations are usually in the radial direction of the core in order to place the turns of the coil according to a predetermined positioning arrangement, usually referred to as "stratification", along the radial extension of the slots. Winding principles of this kind are well known and described in U.S. Pat. Nos. 6,533,208, 6,991,194 and 6,622,955 now assigned to the assignee of the present application.

In winding scenarios for optimizing the stator dimensions and increasing the amount of wire that is required to fill the slots, the needle may not move within the slots of the core to deliver the wire. This is particularly due to the large dimensions of the needle with respect to the slot openings through which the needle would need to pass to enter or exit the slots. In addition, due to the large quantity of wire filling the slots, enough slot spacing would lack for any movement of the needle.

It follows that for these scenarios it is desirable that the needle is kept constantly outside the slots during winding. Accordingly, the wire leaving the needle needs to be deflected and guided for entering the slots to reach required predetermined positions to form the wire coil. Only in this manner can the turns of the wire coil be deposited regularly within the slots, i. e. with a desired position order and without crossing one another, to achieve a coil having a high amount of wire placed in a minimum slot space. The accuracy with which the wire is positioned to form the wire coils is influenced by the speed of relative motion of the needles with respect to the core, and by the positioning accuracy that occurs in the operations and devices for guiding and positioning the wire during winding.

U.S. Pat. No. 3,338,526 provides movable needles for winding stators with wire guides, which are positioned adjacent to the ends of the stator poles. The wire guides are sustained by support means located within the interior of the stator. Modern brushless cores like those wound according to the invention are designed to be extremely compact with high pole and wire occupancy. This means that the size of the cylindrical interior of the core leaves very little space for structural arrangements required to support or move the wire guides as shown in U.S. Pat. No. 3,338,526.

U.S. Pat. No. 2,573,976 also provides movable needles for winding stators with wire guides, which are positioned adjacent to the ends of the stator poles. The needle is constrained to move outside the slot of the stator during the translation strokes that bring the needle between the two ends of the stator. At the end of the stator, the needle moves in a radial direction to bring the wire over a winding guide and into the slots. The wire is then deflected by the wire guide onto further wire guides having a conical configuration. The further wire guides definitely direct the wire against the end of the stator according to a random disposition.

SUMMARY OF THE INVENTION

It is therefore an object of this invention to provide a method and apparatus for winding cores of dynamo electric machines by relatively moving needles in conjunction with wire guides to deliver wire so that it becomes accurately positioned to form the wire coils.

A further object of the invention is to provide a method and apparatus that allows winding at elevated speed and concomitant accuracy in positioning the wire turns around the poles of the core.

The above and other objects are achieved by an apparatus and method according to the invention for winding wire coils in slots located adjacent to poles of a core member of a dynamo electric machine component, as defined respectively by independent claims 1 and 24.

Preferred embodiments of the invention are defined by the dependent claims and in the following description.

The principle underlying the invention provides wire guides that are relatively movable with respect to the needle and the core so that a wire leaving the needle can be delivered to predetermined positions around the poles of the core in order to form the wire coils. The wire guides are supported adjacent to the ends of the core by support means partially occupying positions of the trajectory where the needle needs to move during winding. The support means are movable according to the position occupied by the needle around the poles. The wire guides and the needle relatively move in the radial directions of the core to position the wire within the slots according to an orderly arrangement providing wire turns located progressively at different radial distances along the pole

BRIEF DESCRIPTION OF THE DRAWINGS

Further features of the invention, its nature and various advantages will be more apparent from the accompanying drawings and the following detailed description of the preferred embodiments.

In the drawings:

In FIG. 1 some parts have been omitted for reasons of clarity.

In FIG. 5 parts like the clamps shown in FIGS. 3 and 4 for holding wire guides have been omitted for reasons of clarity.

In FIG. 6 some parts have been omitted for reasons of clarity.

FIG. 8 shows the stator and the housing that have been omitted in FIG. 6 for reasons of clarity.

FIGS. 13a and 13b respectively show the winding steps of FIGS. 10 and 11, whilst FIG. 13c shows a successive winding step.

FIG. 14 is a view similar to FIG. 3 although showing a third embodiment of the present invention. The housing shown in FIG. 14 has been rendered transparent to show parts that would otherwise be hidden.

FIG. 16 is a partial view of FIG. 14 illustrating operational sequences of the third embodiment of the present invention.

FIG. 17 is a partial view of FIG. 14 illustrating further operational sequences of the third embodiment of the present invention.

DETAILED DESCRIPTION OF THE INVENTION

Figure 5:
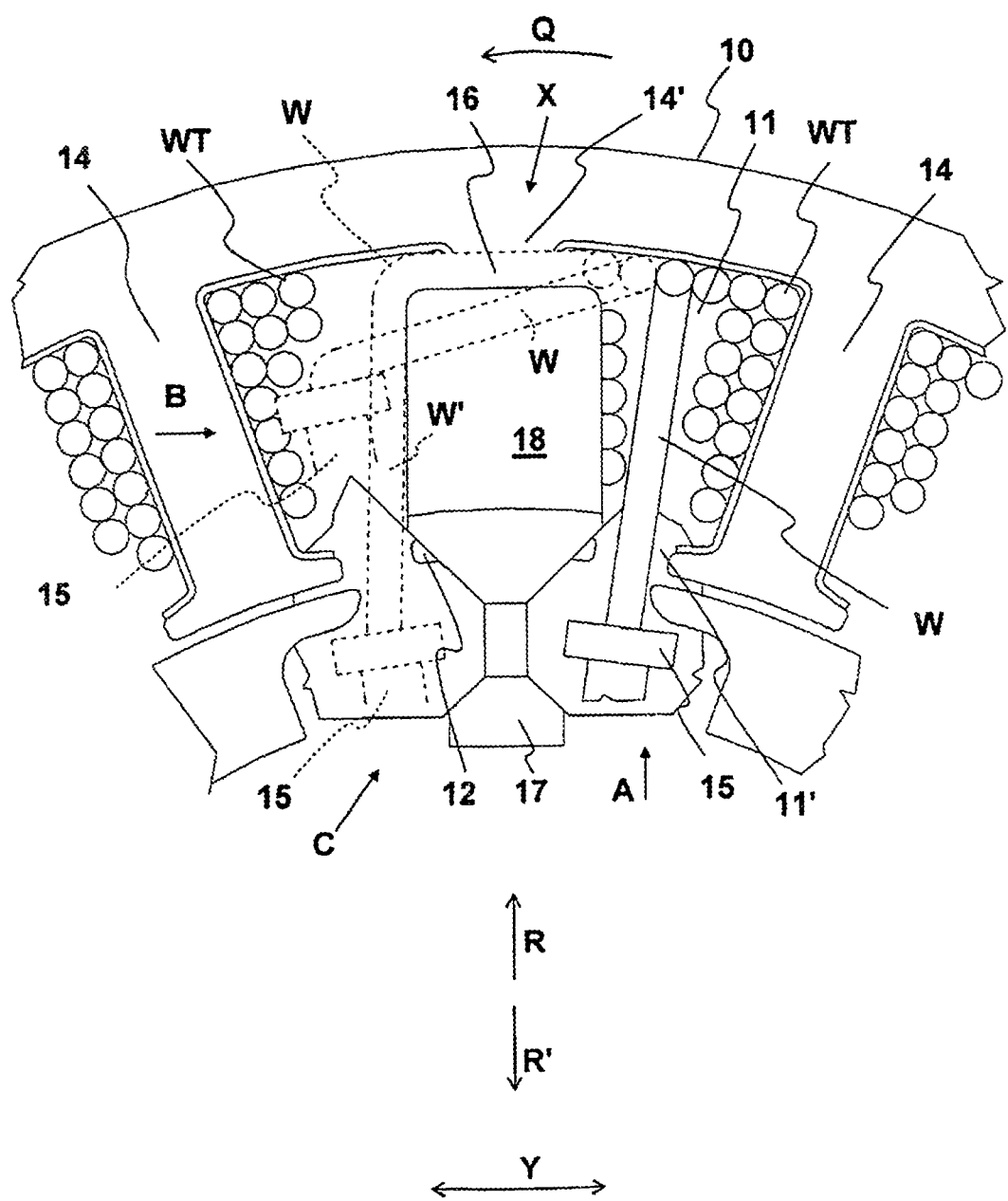
FIG. 5 is an enlarged view of area 5 of FIG. 4 showing a winding needle in various steps of a winding operation performed according to the present invention.

A dynamo electric core such as a stator 10 having a central axis O provides slots 11 (generally shown in the above Figs. and shown in detail in FIG. 5) where a wire W is delivered by a needle 15 for forming wire turns WT wound around poles 14. In order to optimise the amount of wire occupancy in the available space of slots 11, wire turns WT need to be in line according to the radial direction R of the slots, and also according to the transverse directions Y, as shown in FIG. 5. Needle 15 may be oversized with respect to the dimensions of the slots, therefore needle 15 may be relatively moved outside of slots 11 to wind the core, as shown in the Figs. accompanying the present application.

According to the embodiments of the present invention, needle 15 and stator 10 are relatively moved with: translation motions in two opposite directions P and P', radial translations in two opposite directions of the stator R and R', and two opposite rotations Q and Q'.

The relative translations in directions P and P' can be obtained by translating the needle with the solutions described in the above cited prior art. It should be contemplated that stator 15 is caused to translate with solutions providing motor drives that translate housing 25 where the stator is supported during winding.

The relative translations in directions R and R' to stratify the wire along the poles can be obtained by translating the needle in the radial direction of the stator. The solutions for achieving this radial movement can be those described in the previously cited prior art, or the stator is caused to translate in the radial directions by motor drives that translate housing 25 where the stator is supported for winding.

The relative rotation in directions Q and Q' can be obtained by rotating the needle with the solutions described in the previously cited prior art, or the stator is caused to rotate with solutions providing motor drives, like for example a motor and crown drive that rotate the housing where the stator is supported for winding.

Figure 2:
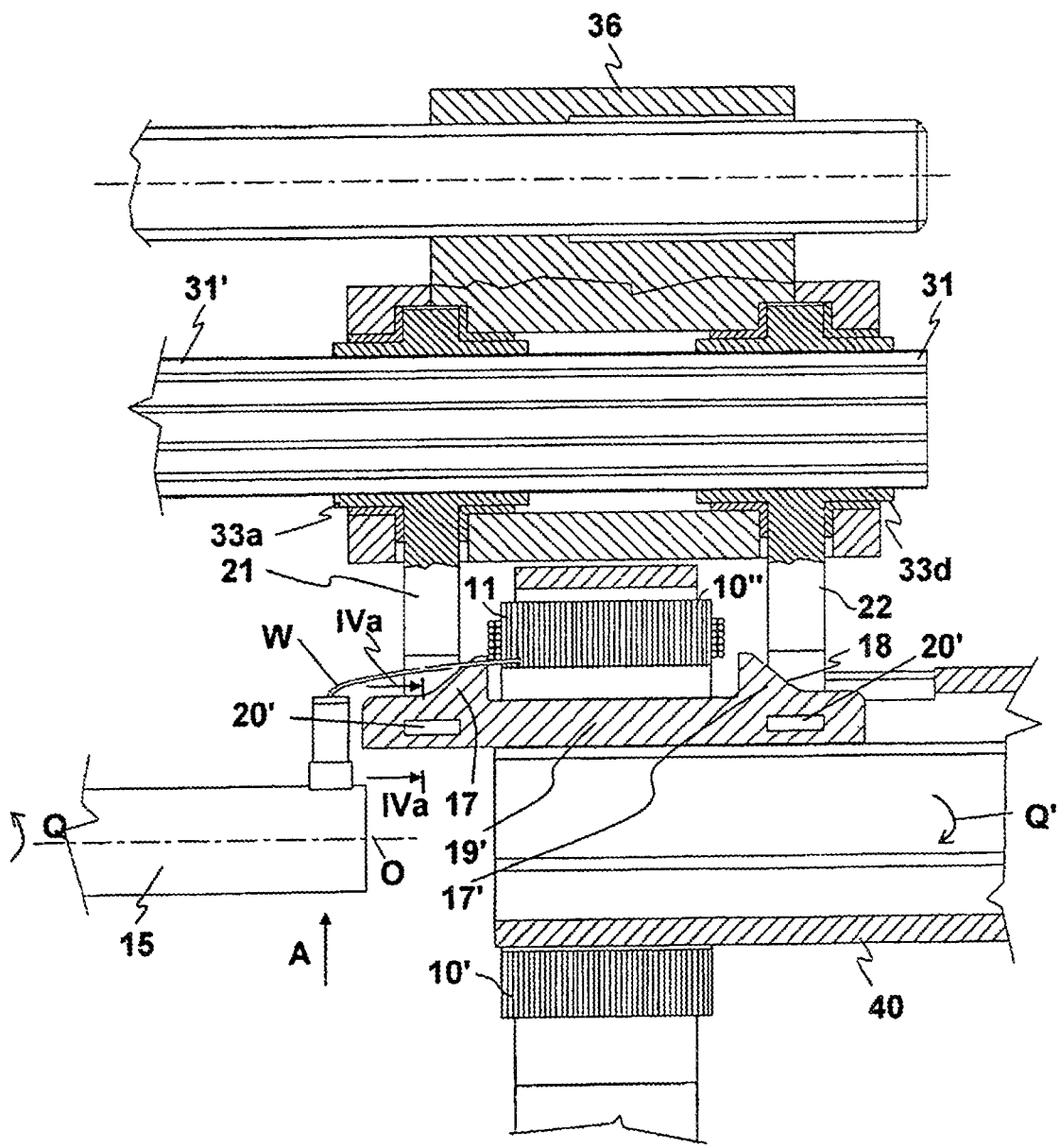
FIG. 2 is an enlarged view of area 2 of FIG. 1

FIG. 5 shows various instances of the winding process where needle 15 relatively moves from position A to B, and then from position B to C. Position A is occupied by the needle at the end of a relative translation motion (for example in direction P, i. e. towards the reader observing FIG. 5) to deliver a portion of a wire turn WT to be wound around pole 14'. In position A, wire W can be tensioned against the bottom of the slots and extending through the slot opening 11' to reach needle 15, like is shown in FIGS. 2 and 5.

After reaching position A, the needle needs to be relatively rotated in direction Q, and also relatively translated in direction R, in order to reach position B. During these movements to reach position B, wire W overlaps ledge 16 of wire guide 17 to become aligned with area X of the pole where the wire needs to be definitely located to form the wire coil. At the same time, wire guide 17 can be relatively translated in direction R to reach the alignment of ledge 16 with area X of pole 14'. These relative movements of the wire guide in the R direction to align the wire with the various areas of the pole, as the wire coil continues its formation, generate a stratification arrangement that optimizes the wire occupancy in the slots.

By continuing with an opposite relative translation in direction R', the needle moves to position C, from where it can start opposite relative translation in direction P'. This movement makes the needle pass through stator 10, without being present within the slots in order to reach end 10".

During the movements of the needle between positions and C, wire W continues to run on wire guide 17 so that extension W' of the wire is bent to avoid alignment with tip 12 of the pole, which is also necessary to guarantee an unimpeded opposite relative translation in direction P' of needle 15 through stator 10.

Figure 1:
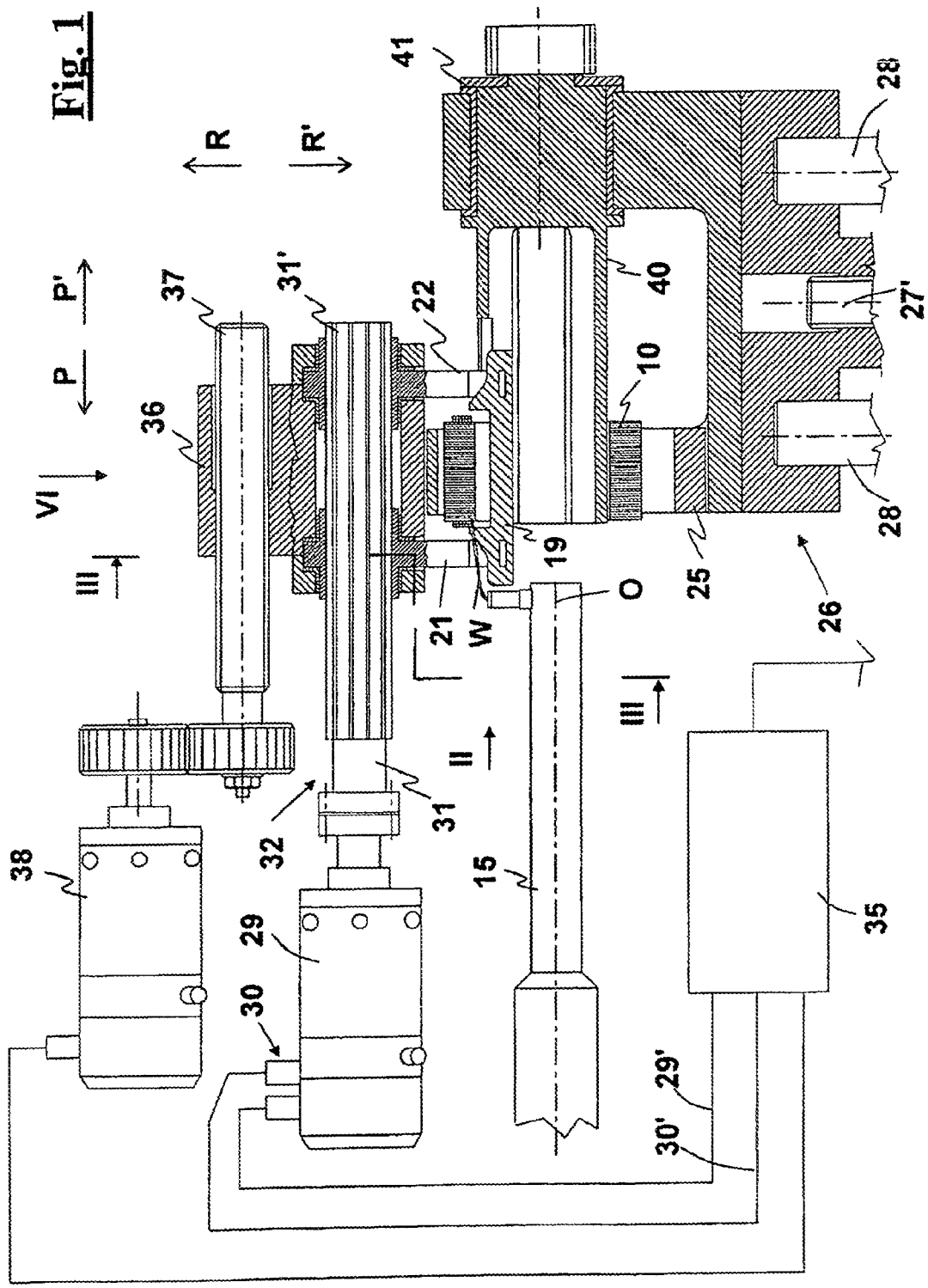
FIG. 1 is a partially cross sectioned elevation view showing a first embodiment of the present invention.

In order to continue to form an entire wire turn, needle 15 relatively travels to opposite end 10" of the stator, where relative movements of the needle in conjunction with a second wire guide 17' need to occur. Wire guide 17' can be similar to wire guide 17, although wire guide 17' needs to be oppositely oriented, as shown in FIGS. 1 and 2. The relative movements of needle 15 at end 10", and also those of wire guide 17', can be similar to those of needle 15 and wire guide 17 previously described as occurring at end 10', except from the relative rotation of needle 15 at end 10" that needs to be in opposite direction Q'. Finally, to complete a wire turn, needle 15 will return to end 10' by means of a relative translation in direction P.

Wire guide 17 can be a portion of single piece 19 (see also FIGS. 1 and 2), which also has a portion consisting of wire guide 17'. The two guide portions can be joined by body portion 19'. Wire guide portions 17 and 17' can have slanted riser portions where the wire can run to reach ledges 16 while the needle relatively moves between positions A and C. Wire guide portions 17 and 17' can be equipped with respective contact surfaces 20 for being gripped by claw members 21 and 22 (see also FIG. 4a). Claw members 21 and 22 can grip on surfaces 20 in order to firmly hold piece 19, and therefore hold wire guides 17 and 17' adjacent to the ends of stator 10, as is required to accomplish the winding steps described with reference to FIGS. 1-5.

The tips of the claw members can terminate in end portions that are received in windows 20' of piece 19. The portions of clamps 21 and 22 that engage surfaces 20 are sized to extensively engage in order to firmly hold wire guides 17 and 17' in predetermined relative positions with respect to the stator during the winding steps described with reference to FIGS. 1-5. Moreover, each of clamps 21 and 22, on its own, is suitable for supporting piece 19. In other words, clamps 21 can be gripping on respective surfaces 20 to support piece 19 (see FIG. 3) when clamps 22 are not gripping on corresponding engaging surfaces 20. Similarly, clamps 22 can be gripping on corresponding engaging surfaces 20 to support piece 19 when pair of clamps 21 are not gripping on corresponding engaging surfaces 20 (see FIG. 4). In this situation, either clamps 21 or clamps 22 will be singularly holding piece 19. Accordingly, the clamps that are holding piece 19 can resemble a cantilever structure arrangement.

Figure 3:
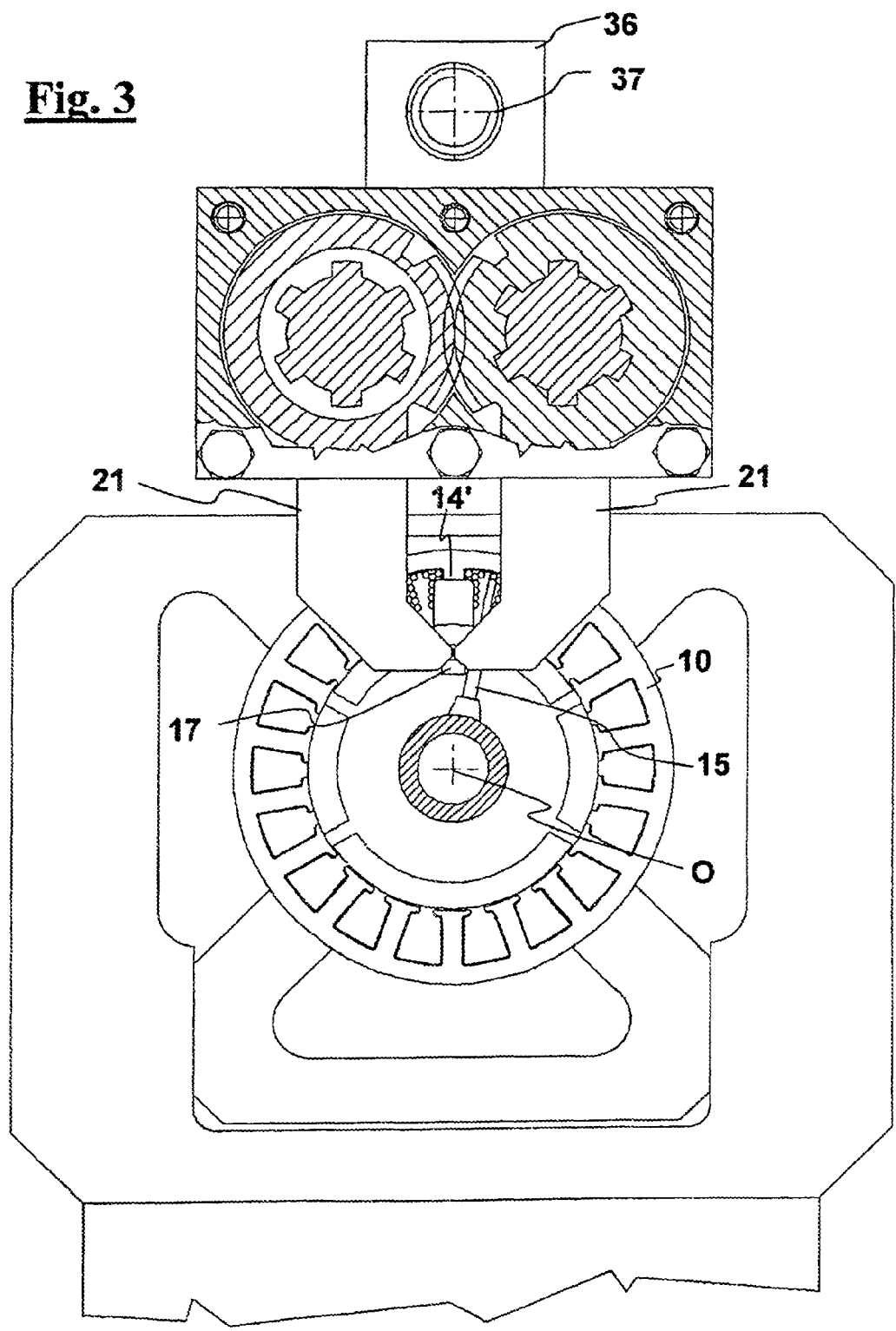
FIG. 3 is a partial cross sectional view, as seen from directions 3-3 of FIG. 1 illustrating a specific winding step according to the present invention.
Figure 4A:
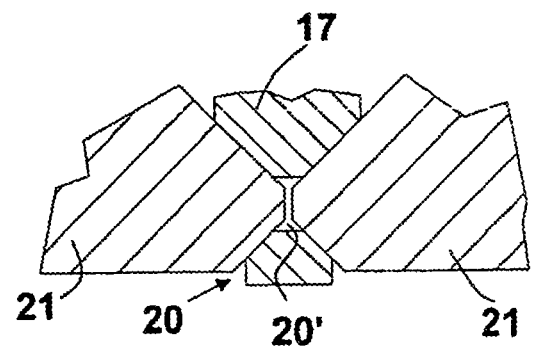
FIG. 4a is a partial cross sectional view as seen from directions 4a-4a of FIG. 2

FIG. 3 shows the situation where clamps 21 are gripping piece 19, while needle 15 is moving inside the stator with relative translation in direction P to reach a position A at end 10'(towards the reader observing FIG. 3). More particularly as shown in FIG. 3, clamps 21 are holding piece 19, and are doing so by occupying positions of the winding trajectory along which needle 15 needs to move in conjunction with wire guide 17 at end 10'. The movements will be in the manner that has been described with reference to FIG. 5. Prior to the needle reaching clamps 21, as they are shown in FIG. 3, clamps 21 need to be moved out of the way (see FIG. 4) to allow the needle to reach a position A shown in FIGS. 2 and 5. By moving clamps 21 out of the way, the required trajectory of needle 15 is no longer occupied by clamps 21, therefore needle 15 can complete the translation in direction P and can also be moved to positions B and C, like has been described with reference to FIG. 5. In this situation of clamps 21 having been moved out of the way and released piece 19, piece 19 can be supported by clamps 22 so that wire guide portions 17 17' are correctly positioned at ends 10' and 10". Similarly, the necessary movements of needle 15 at end 10" can occur shifting portion 22a of clamps 22 out of the way, like has been described for clamps 21 when clamps 22 are required to continue to support piece 19 to maintain the required positions of wire guide portions 17 and 17' at ends 10' and 10".

As previously described, wire guides 17 and 17' need to be relatively moved in radial directions R and R' to align ledge 16 with the area X of the pole where the wire W needs to be drawn. This relative movement, in the radial direction can be achieved by moving the stator or the needle in the radial direction; for example, in rig. 1 the relative radial movement occurs by moving the stator housing 25 in direction R with assembly 26. Assembly 26 provides a motor and screw drive (the motor is not shown) for rotating screw 27 in a threaded sleeve portion 27' of support housing 25. Guide rods 28 can be suitable for supporting and guiding support housing 25 during movement in directions R and R'.

Figure 4:
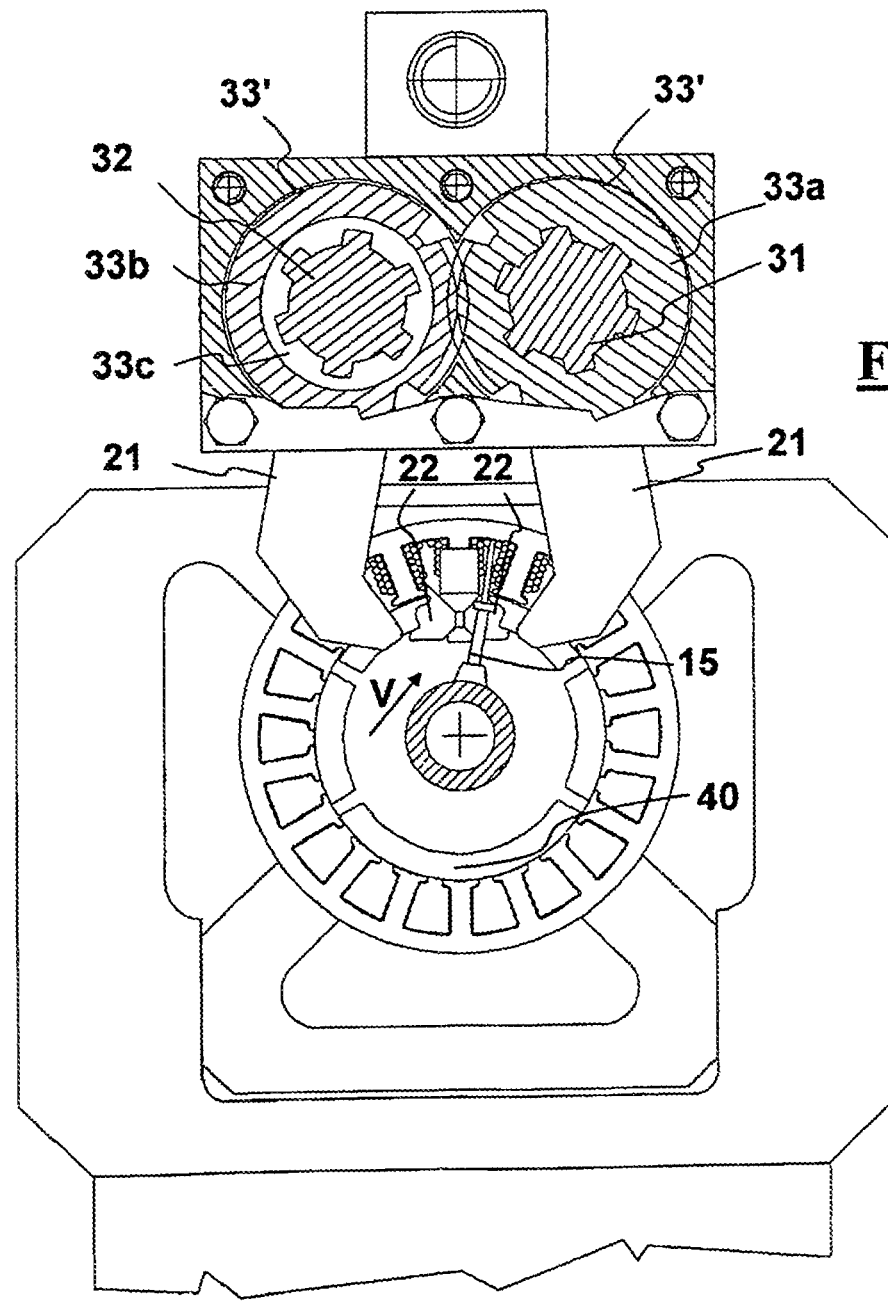
FIG. 4 is a view similar to FIG. 3 although showing another winding step according to the present invention.

For actuating clamps 21 and 22 to hold piece 19 according to the foregoing description, two motors 29 and 30 are provided. Each motor is coupled to a respective shaft 31 and 32. In FIG. 1, motor 30 and shaft 32 are hidden respectively by motor 29 and shaft 31. Shafts 31 and 32 have key portions 31', which engage in ways of respective support sleeves 33a, 33b, 33c, 33d. Each support sleeve carries a respective clamp of clamps 21 and 22. As shown in FIGS. 3 and 4, clamps 21 are supported by respective sleeves 33a, 33b, whilst clamps 22 are supported by respective sleeves 33c, 33d. Support sleeves 33a, 33b, 33c, 33d have an external toothed portion 33' for meshing with a similar meshing portion of an adjacent support sleeve 33a, 33b, 33c, 33d, like is shown in FIGS. 3 and 4 for clamps 21.

Rotation of shafts 31 and 32, by means of their respective motors 29 and 30, causes rotation of support sleeves 33a, 33b, 33c, 33d, so that clamps 21 or 22 are caused to release or hold piece 19. Motors and 30 can be independently powered by lines 29' and 30' connected to drive and control means 35, which can power a bidirectional rotation of motors 29 and 30, in a synchronized and sequenced way achieved by the previously described operations of causing clamps 21 and 22 to grip and release piece 19 as a function of the position of needle 15 around the pole.

As shown in FIGS. 3 and 4, shaft 32 passes through support sleeve 33b of clamps 21 (see the left side support sleeve of FIGS. 3 and 4) with a certain clearance. Shaft 32 reaches and engages a directly opposite support sleeve 33c (partially visible in FIGS. 3 and 4), which carries one of clamps 22. Shaft 32 turns support sleeve 33c of clamps 22, like is the case for shaft 31, which causes support sleeve 33a shown on the right side of FIG. 3 to rotate. The partially hidden support sleeve 33c meshes with the support sleeve 33d of clamps 22 shown in FIGS. 1 and 2. In this way support sleeves 33c, 33d of clamps 22 can be rotated by shaft 32 linked to motor 30, independently of the rotation of the support sleeves 33a, 33b of clamps 21.

Support sleeves 33a, 33b, 33c, 33d are assembled on a frame member 36, which can be translated on guides (not shown) in directions P and P' by means of screw 37 which can be rotated by motor 38. The translations of frame member 36 have the effect of separating more or less wire guides 17 and 17' respectively from end 10' and end 10" of stator 10. The separation can occur in synchronization with the movements of needle 15. For example, guide portion 17 can be brought nearer to end 10' (by rotation of screw 37 in one direction), before needle 15 arrives and accomplishes relative motions at end 10', like those described with reference to FIG. 5. Similarly, guide portion 17' can be brought nearer to end 10" (by rotation of screw 37 in opposite direction P'), when needle 15 has to accomplish relative motions at end 10", like those described with reference to FIG. 5. The step of separating guide portions 17 and 17' more or less from ends 10' and 10" changes the running distance that wire W needs to accomplish from ledge 16 of guide portions to stator 10 when needle is relatively moving at ends 10' and 10". This distance can help in the accuracy with which wire W is positioned on stator 10 and can be determined in practice as a function of the winding parameters and the core configurations that need to be wound.

As an alternative to using motors 29 and 30 to open and close clamps 21 and 22, it should also be contemplated to couple shafts 31 and 32 to the motor and mechanical drives for moving needle 15—as described in U.S. Pat. Nos. 6,533, 208 and 6,622,955—by means of gear transmission and cams which synchronize opening and closing clamps 21 and 22 with the winding movements of needle 15.

As an alternative for moving wire guides 17 and 17' in radial directions R and R', it should also be contemplated that motor and guide assemblies (not shown) would be suitable for moving frame member 38 in radial directions R and R'.

Tube portions 40 may be contemplated to shield the tips of adjacent poles 14 against catching of wire W on adjacent poles when winding pole 14'. As shown in FIG. 1, tube portions 40 can be clamped to clamping constraint assembly 41, which can be part of the carriage that moves on guides 28.

With reference to the embodiment shown in FIG. 1, stator 10 can be positioned with respect to piece 19, like is required to start winding an unwound stator, by opening clamps 22, moving housing 25 sufficiently in direction R to clear guide portions 17 and 17', and by translating frame member 36 in direction P'.

Although not shown, stator housing 25 may be equipped with index means for turning stator 10 around axis O to position further poles in alignment with wire guides 17 and 17', like it has been shown for pole 14'.

Control means 35 can be programmed with algorithms and parameters that can control motors 29 and 30 according to a numerical position control that can achieve specific rotations of motors 29 and 30, when the needle is at certain predetermined positions with respect to the pole. In this way, clamps can be opened and closed as a function of the needle position during winding to accomplish the winding principles described previously with reference to FIGS. 1-6. This can be provided in a similar wanner also for the other motors: for example for the motor (not shown) accomplishing the relative movement of the housing in the radial directions R and R', and for motor 38 that shifts wire guides 17 and 17' from the ends of the stator.

A further embodiment of this invention is shown with reference to FIGS. 6-12. Two pieces 50 and 51 for supporting respective wire guide portions 52, 52' and 53, 53' are positioned through stator 10 (in FIG. 6 stator 10 has been omitted for reasons of clarity, although it is shown in FIGS. 8-11). Each of pieces 50 and 51 can be similar to portions of a tube with wire guide portions 52, 52', 53, 53' formed from respective structural extensions as shown in FIGS. 6-12. The structural extensions can be upstanding portions separated by a certain distance to provide free spacing that acts as a wire passage 54 during winding.

Figure 6:
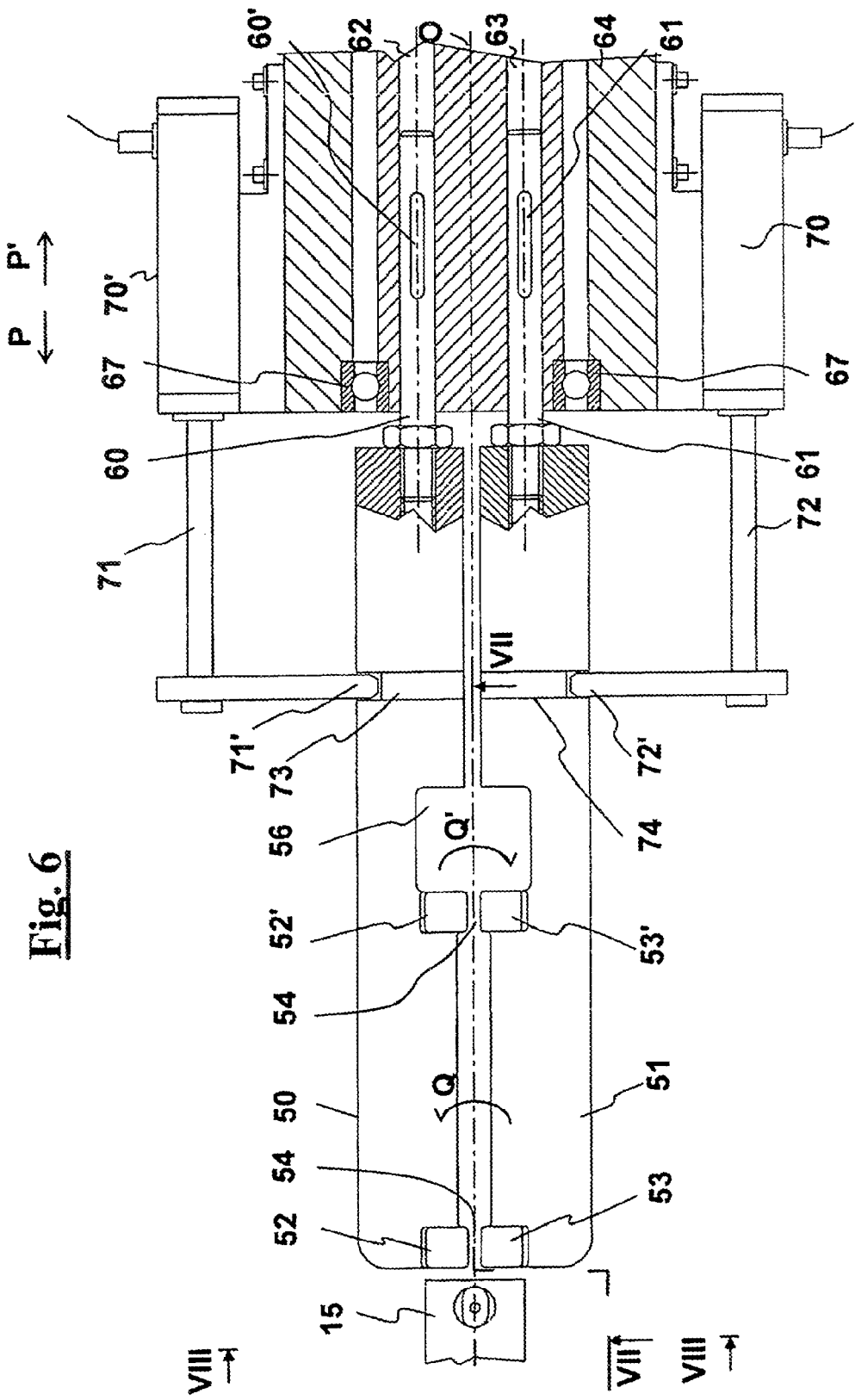
FIG. 6 is a partially cross sectioned plan view as it would be seen from direction 6 of FIG. 1, although showing a further embodiment, of the present invention.
Figure 7:
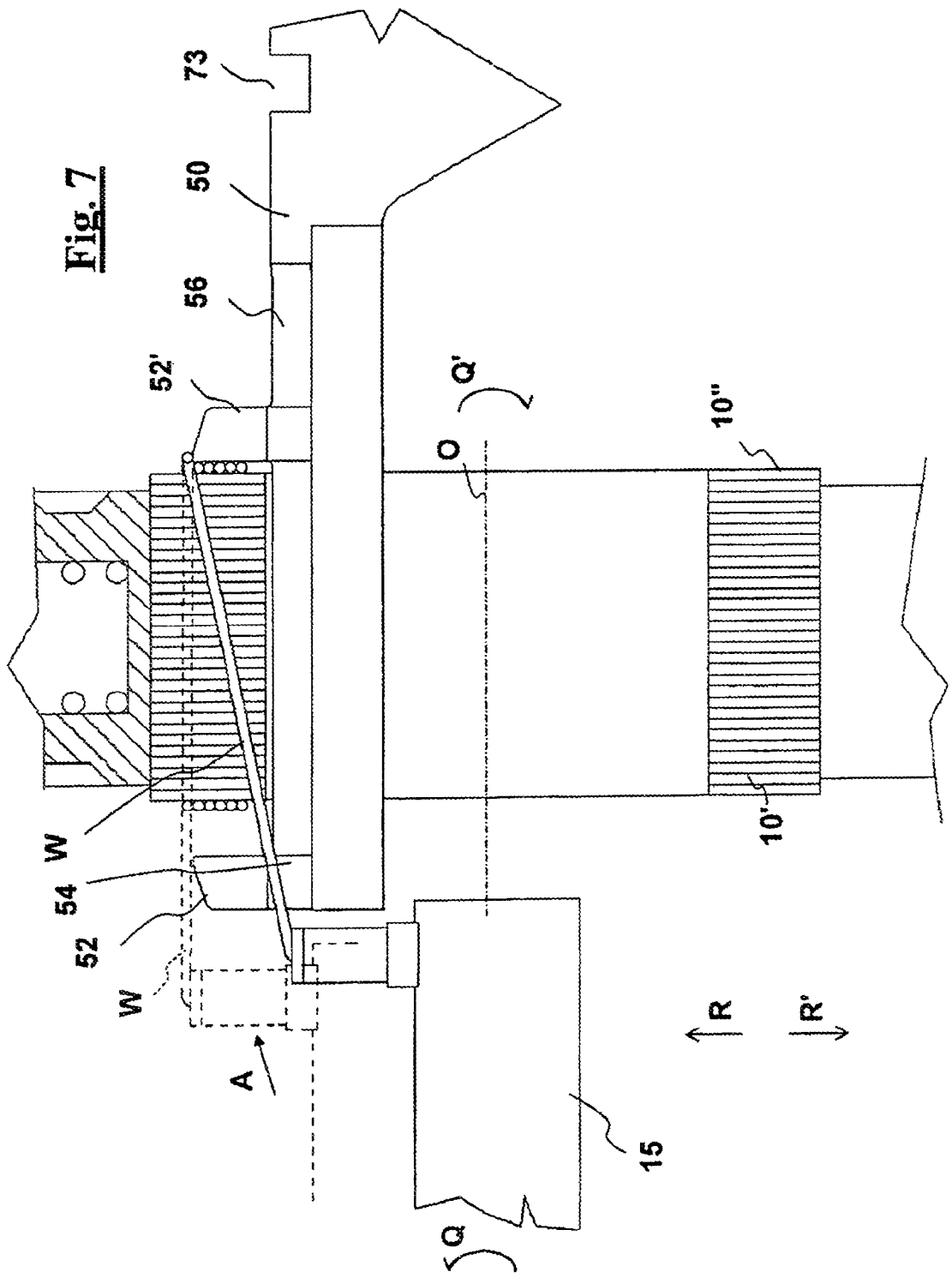
FIG. 7 is a partial cross sectional view, as seen from directions 7-7 of FIG. 6.
Figure 8:
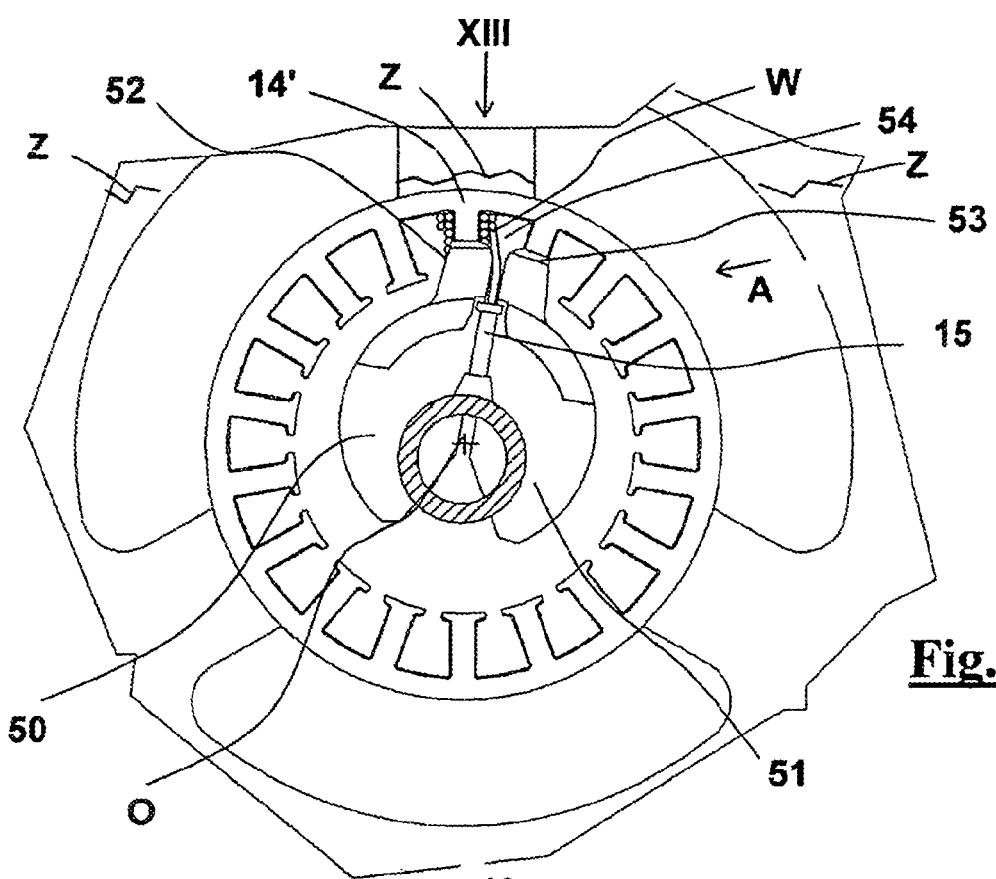
FIG. 8 is a partial cross sectional view, as seen from directions 8-8 of FIG. 6 illustrating a specific winding step according to the present invention.
Figure 9:
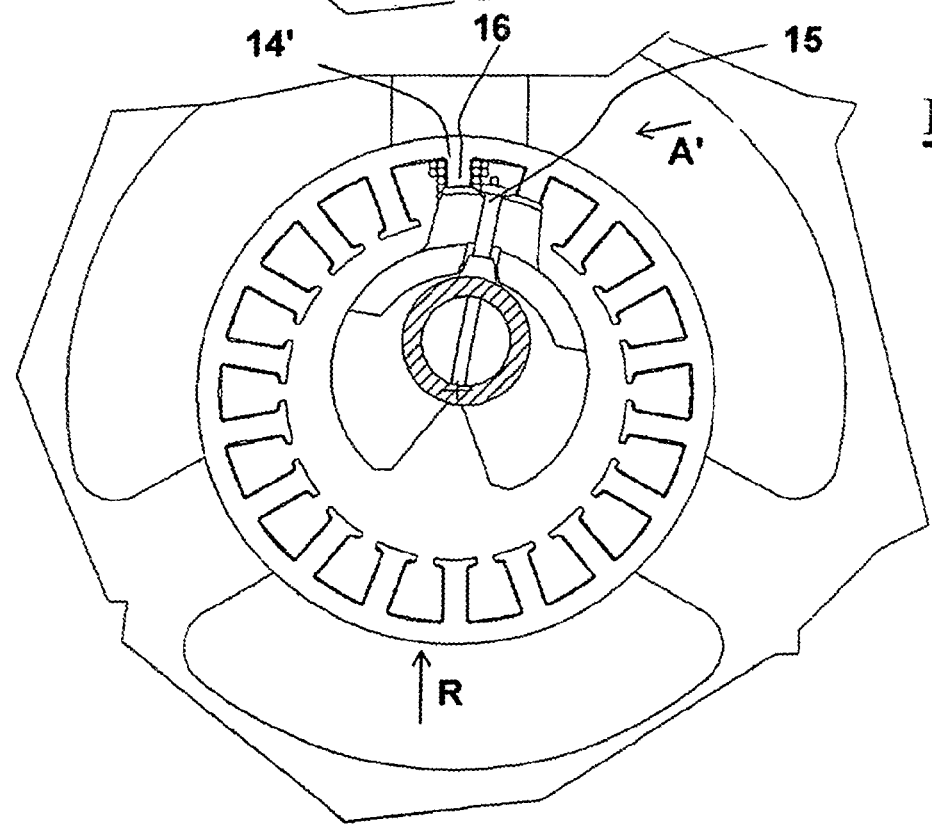
FIG. 9 is a view similar to FIG. 8, although showing another winding step according to the present invention.
Figure 10:
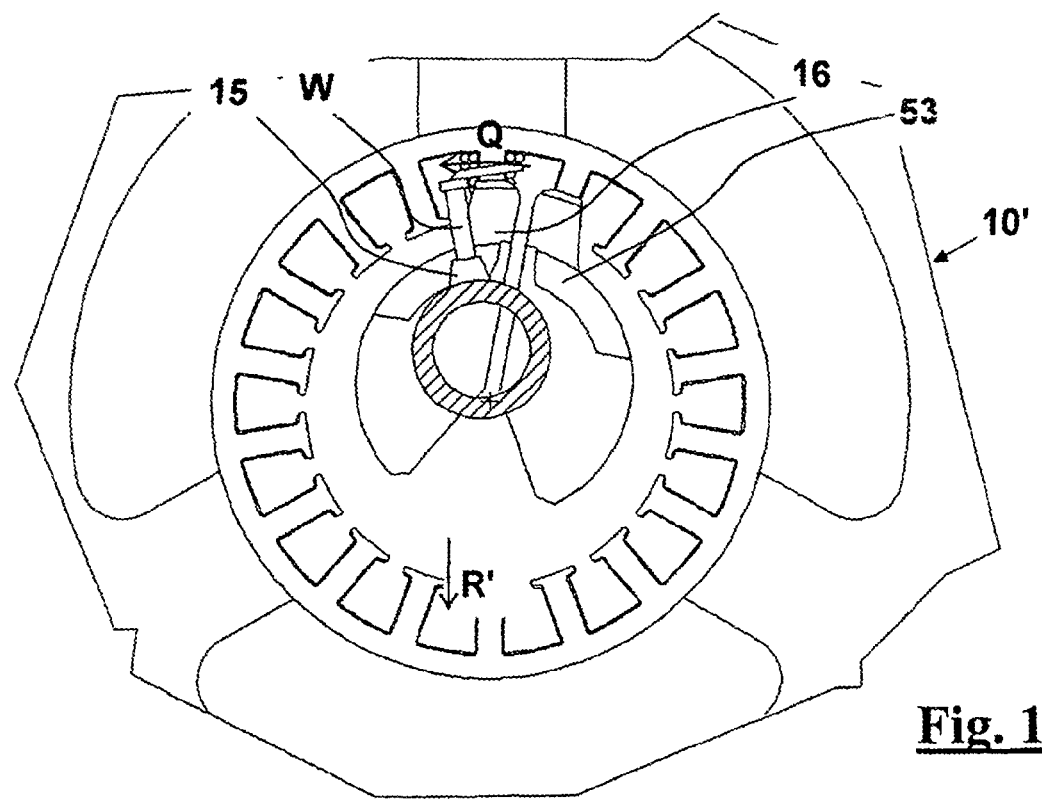
FIG. 10 is a view similar to FIG. 8, although showing a further winding step according to the present invention.
Figure 11:
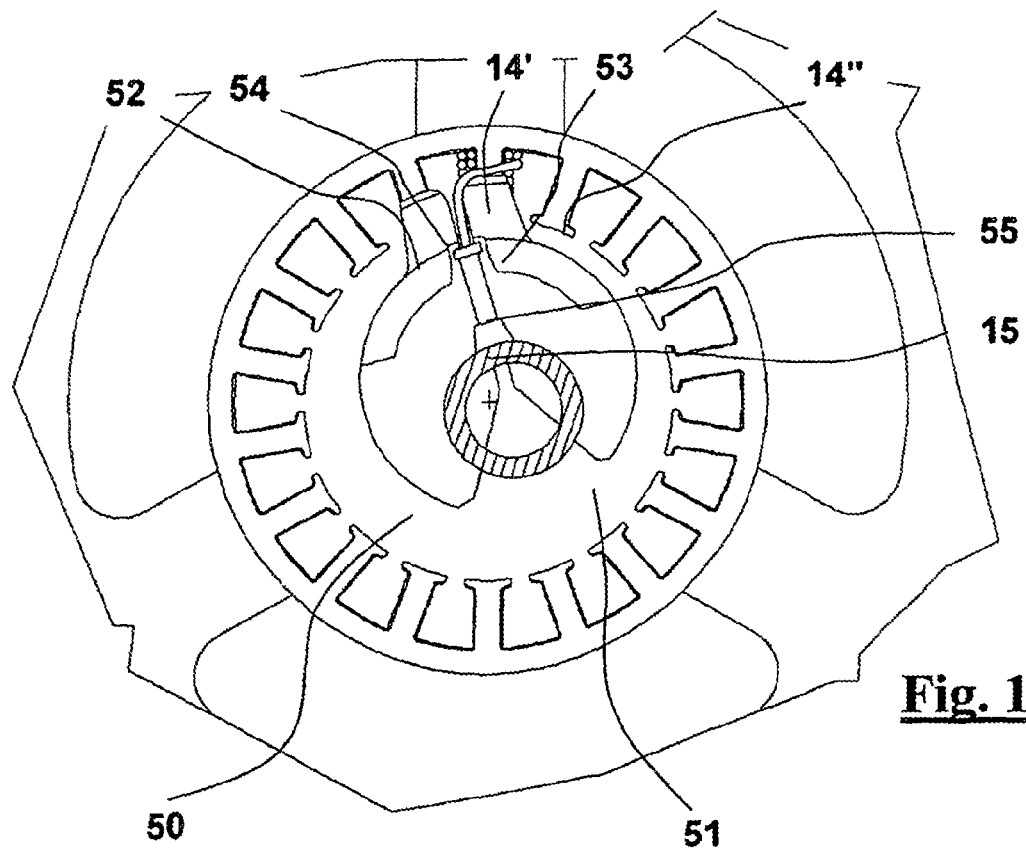
FIG. 11 is a view similar to FIG. 8, although showing an even further winding step according to the present invention.
Figure 12:
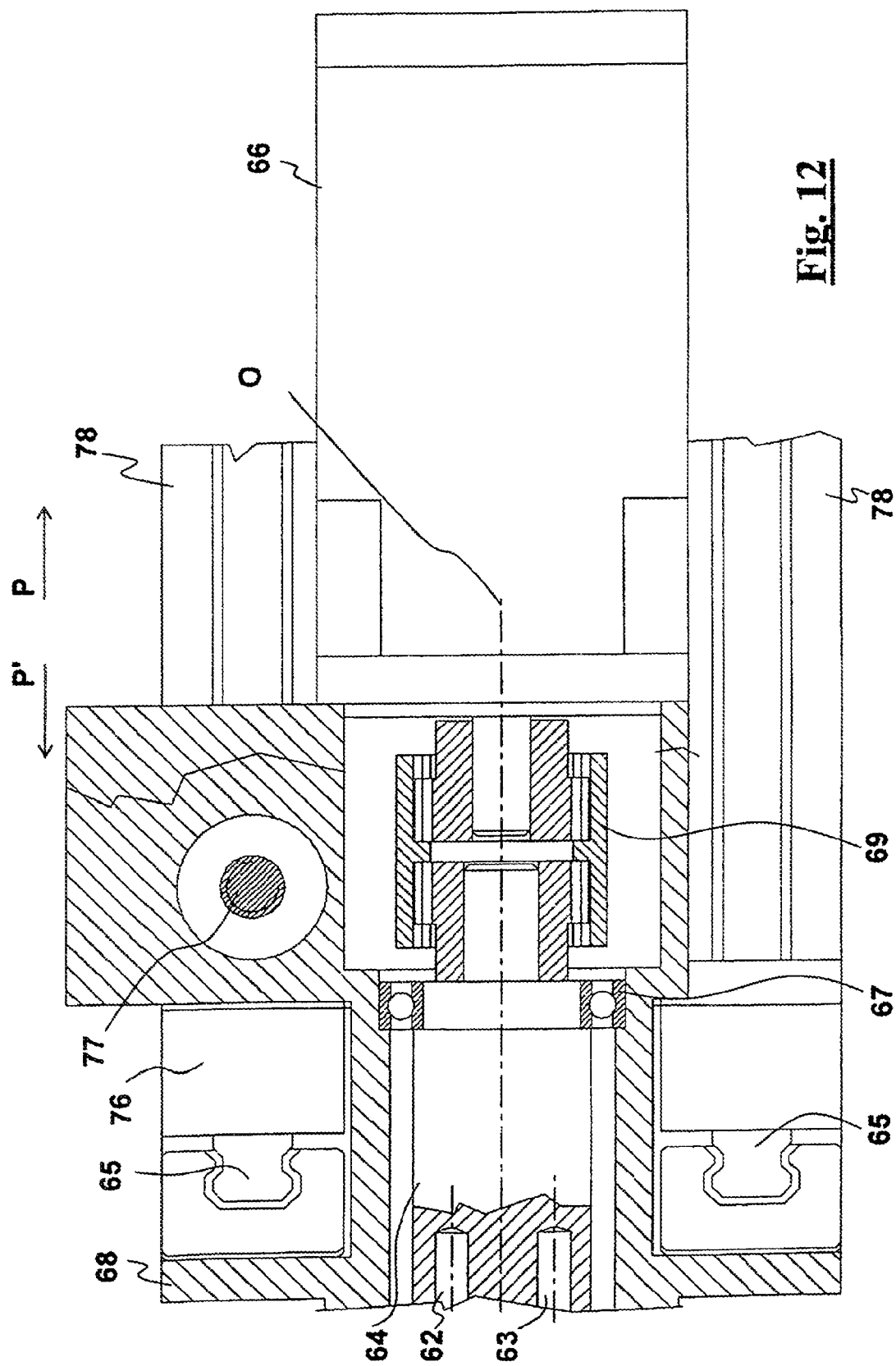
FIG. 12 is a continuation of the right side of the partial cross sectional view of FIG. 6.

Needle 15 can be relatively moved in conjunction with wire guides 52, 52', 53, 53' at ends 10' and 10" of the stator, like is shown in FIGS. 8-11. More particularly, FIGS. 7 and 8 show needle 15 at the end 10' of the stator when a translation stroke in direction P is finishing, like is position A of FIG. 5. Here, wire W reaches the needle by passing through passage 54 (see also FIG. 8). From position A, needle can be relatively moved in radial direction R to reach position A' in order to align wire W above ledge 16 of wire guide 52 (see also FIGS. 7 and 9). Then, needle 15 can be relatively rotated in direction Q to pass the wire across pole 14' and above ledge 16 of wire guide 52 (see FIG. 10). At this point, pieces 50 and 51 can be relatively rotated (see FIG. 11) to align wire guide 53 with pole 14'. This also aligns passage 54 with the slot where the wire will need to return into stator 10. Successively, needle 15 can be relatively moved in opposite radial direction R' and translated in direction P' back into the stator (see FIG. 11) for completing a wire turn WT at end 10". During the initial step of the relative translation in opposite direction P', needle 15 can pass through passage 55, whilst wire W passes through passage 54. At the same time wire W is also drawn definitely across pole 14' in the position that is aligned with ledge 16 of wire guide 53. Passage 55 can be an enlargement of the spacing existing between pieces 50 and 51 as shown in the figures. At end 10", the needle can continue the wire turn by accomplishing relative movements in conjunctions with wire guides 52' and 53', like those described for end 10' in conjunction with wire guides and 53, except from the relative rotation which will be substituted by an opposite rotation in direction Q'. Large spacing 56 is formed between pieces 50 and 51, as shown in FIGS. 6 and 7, for allowing the movements of needle 15 at end 10".

Pieces 50 and 51 can be moved more or less in directions P and P' to distance wire guides 52, 52', 53, 53' more or less from ends 10' and 10" of the stator, for the same reasons that have been described with reference to the previous embodiment. Pieces 50 and 51 may be distanced from ends 10' and 10" differently with respect to each other in the step of FIGS. 8-11. More particularly, wire guides 53, 53' may need to be positioned further from ends 10' and 10" in order to avoid interference with a completely wound coil (not shown), if present on adjacent pole 14".

Figure 13A:
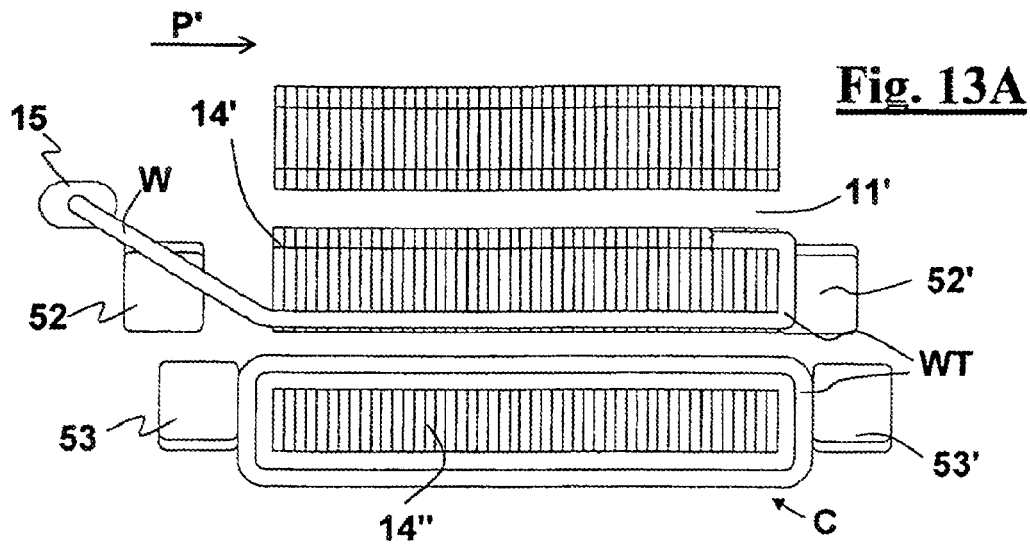
FIGS. 13a, 13b and 13c are cross sectional views from direction XIII of FIG. 8, with certain parts of FIG. 8 removed for reasons of clarity, indicated by either interruption line Z of FIG. 8, or simply by omission.
Figure 13B:
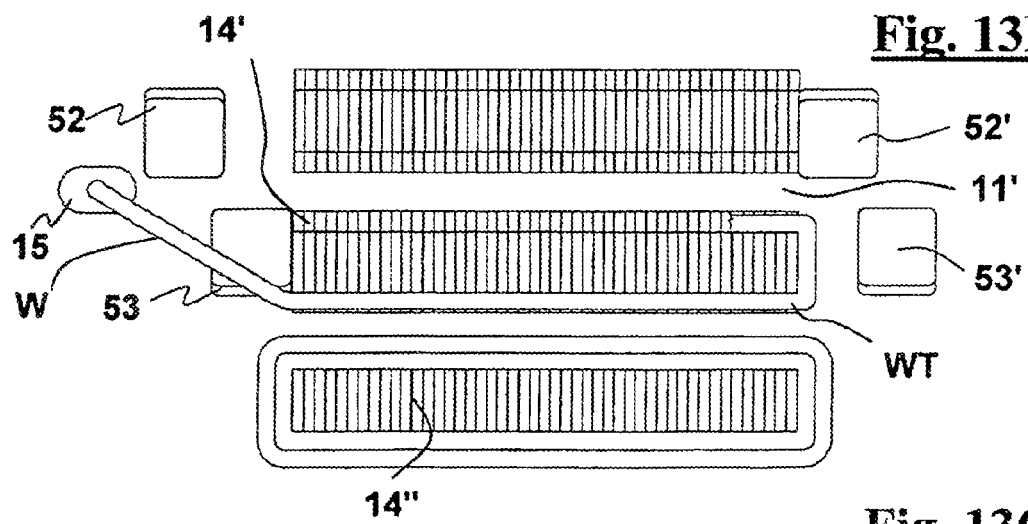
Figure 13C:
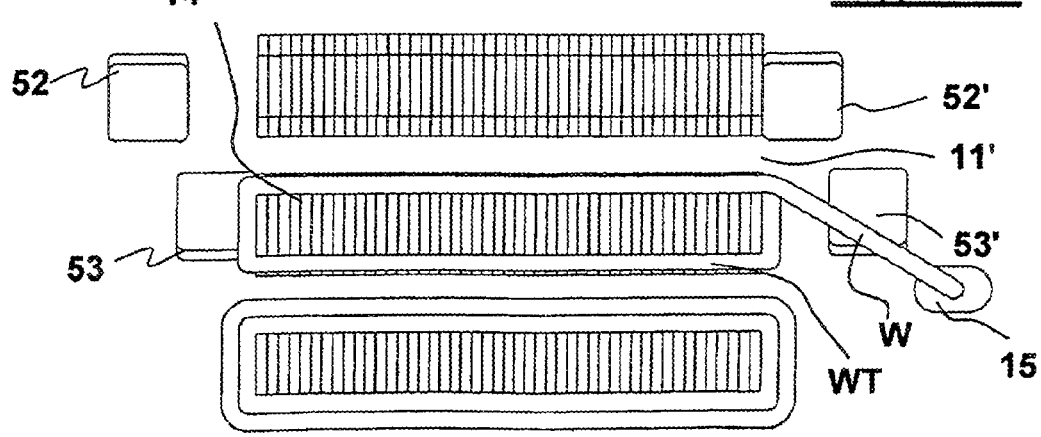

As shown in FIGS. 13a, 13b and 13c, pieces 50 and can be moved more or less in directions P and P' to distance wire guides 52, 52', 53 and 53' more or less from ends 10' and 10" of the stator. In this way wire guides 52, 52', 53 and 53' will be more or less adjacent to a pole being wound in order to support wire W on ledge 16 until a turn is sufficiently wound around a pole. Furthermore, wire guides 52, 52', 53 and 53' may need to be positioned at a certain distance form ends 10' and 10", for accommodating completely wound coils that have been already wound around an adjacent pole 14". As shown in FIG. 13a, wire guides 53 and 53' are maintained at a sufficient distance from ends 10' and 10" to accommodate the turns of finished coil C'. At the same time wire guide 52' has been maintained adjacent to end 10" to continue supporting the turn being formed (see also FIG. 7) at a required stratification level. In FIG. 13b, wire guide 53 has been brought near to pole 14' to support wire W when the needle translates through the stator in direction P' to reach end 10". In FIG. 13c, needle 15 has reached end 10" where it has been translated in direction R and rotated in direction Q' to complete the turn. Following the situation of FIG. 13c, wire guides 52, 52', 53 and 53' will be indexed to occupy the positions shown in FIG. 13a so that a successive turn can be formed.

FIGS. 8-11 show that during the steps of the relative motions of needle 15 to wind the wire coil, certain portions of pieces 50 and 51 occupy positions of the trajectory of needle 15, when needle 15 needs to move in other position of its trajectory for winding.

It has been shown that pieces 50 and 51 are rotated between two angular positions, and that, as a result, needle 15 becomes free to accomplish relative translations in directions P and P'. Also passage 54 has been rotated between two angular positions, so that wire W can pass through passage 54, when needle 15 accomplishes relative translations in directions P and P'. Pieces 50 and 51 can be respectively supported by coupling to shafts 60 and 61. Shafts 60 and 61 can slide in respective guide seats 62 and 63 of shaft 64. Shafts 60 and 61 have a key connections 60 and 61 in guide seats 62 and 63 for transmitting rotation around axis O from shaft 64 to shafts 60 and 61. Shaft 64 is supported on bearings 67 of support member 68. Motor 66, carried by support member 68 and coupled to shaft 64 through joint 69, rotates shaft 64 around centre axis O, thereby rotating pieces 50 and 51 around axis O. Linear actuators 69 and 70 have respective connection arms 71 and 72, which engage, with their tips 71' and 72', respectively grooves 73 and 74 extending along the circular surfaces of pieces 50 and 51. This arrangement causes translation of pieces 50, 51 in directions P and P' and allows rotation of pieces 50 and 51 in directions Q and Q', like has been described in conjunction with FIGS. 8-11. Translation of pieces 50 and 51 in directions P and P' can be required for distancing wire guides 52, 52', 53, 53' more or less from ends 10' and 10". Support member 68 is supported on vertical guides 65 of carriage member 76 for accomplishing movement in direction R, and also oppositely to direction R. A motor (not shown) for turning screw 77, which is engaged in a threaded sleeve of support member 68, translates support member 68 on guides 65 to achieve translation in directions R and R'. Carriage 76 can translate on horizontal guides 78 of the apparatus frame. A motor and a screw (not shown) can cause carriage 76 to translate in directions P and P' to withdraw or to place pieces 50, 51 within the interior of stator 10 at the start, or the end of the winding operations. In combination, stator 10 can be relatively translated in direction R and R' to clear wire guides 52, 52', 53, 53' when translating carriage 76 in directions P and P' to withdraw, or to place, pieces 50, 51 within the interior of stator 10.

Similarly to the solutions presented for the first embodiments, controls like 35 can be equipped with algorithms and parameters that can control the motor 66 of the second embodiment according to a numerical position control, which will cause specific rotations of pieces 50 and 51, and also of wire passage 54, when the needle is at certain positions with respect to the pole. A similar situation can occur for the other motors of the second embodiment; for example, the motors not shown for the relative movement of the housing in the radial directions R and R' and for translating carriage 78 in directions P and P'.

The third embodiment of the present invention is shown with reference to FIGS. 14-17.

Figure 15:
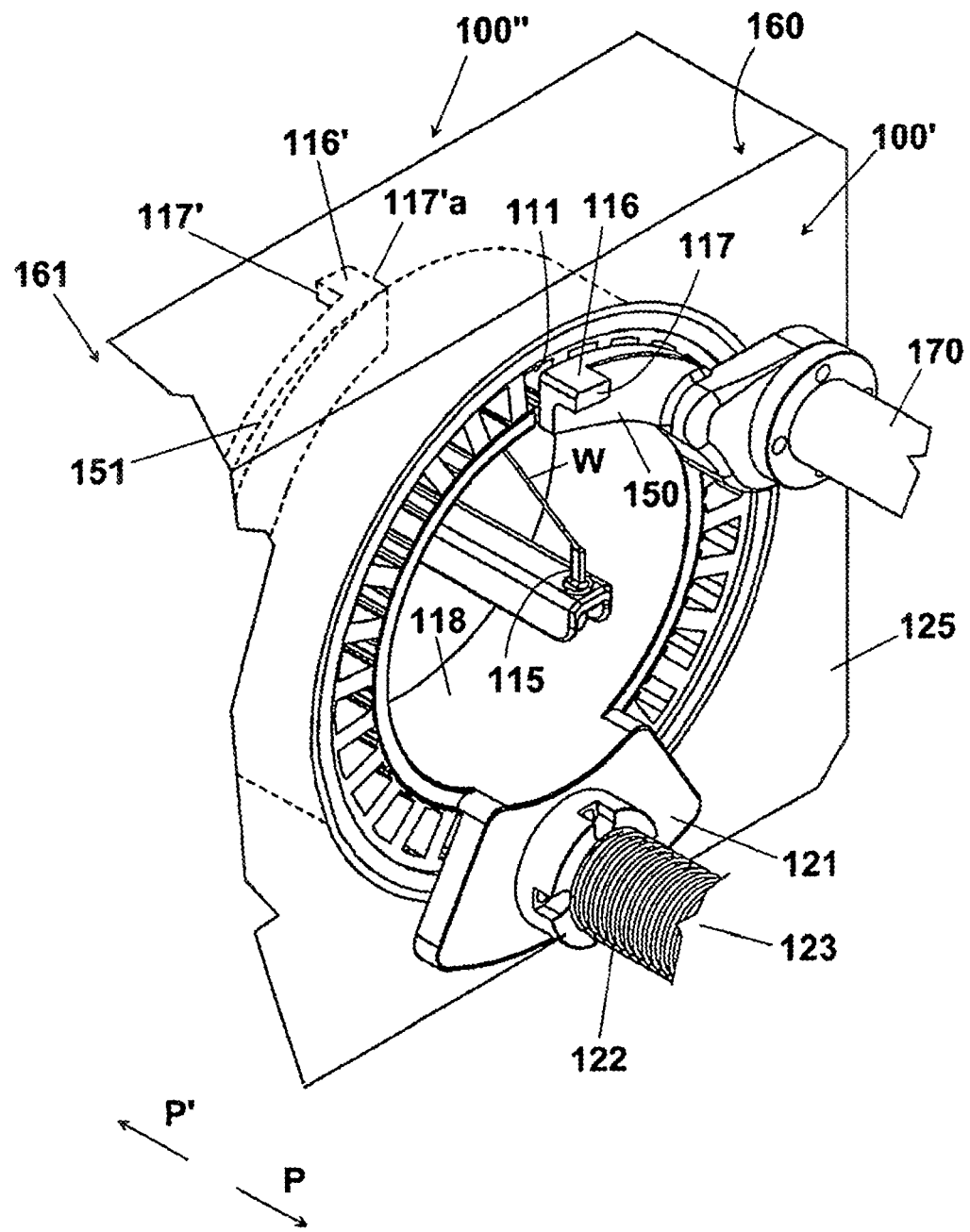
FIG. 15 is a perspective partial view as seen from direction 15 of FIG. 14.

Pieces 150 and 151 carry respectively wire guide portions 117, and 117'. Pieces 150 and 151 are positioned external to stator 10. More particularly, piece 150 is positioned adjacent to end 100' of stator 10 by means of movement assembly 130, whilst piece 151 is positioned adjacent to end 100" of stator 10 by means of movement assembly 131. In FIGS. 14 and 15 piece 151 and guide portions 117' can be seen on the opposite side 100" of the stator, due to the transparency of housing 125.

Support member 121 carries annular ring 118, which becomes centred inside the bore of stator 10 (as shown in FIGS. 14-17) by pushing support member 121 against housing 125.

Support member 121 can be pushed against housing 125 by spring 122, and distanced away from housing 125 by moving shaft 123 in direction P. The mechanism for moving shaft 123 is not shown for reasons of clarity.

Annular ring 118 provides gap 120, which is aligned with the openings of the stator slots 111 by rotating stator 10 around axis O using an index mechanism (not shown). The edges of gap 120 mask the edges of the poles, and therefore act as guide surface for the wire running through the openings of the stator slots. The index mechanism can be present in housing 125. Housing 125 bears the stator, as shown, so that the slots of the stator are aligned with pieces 150 and 151, and therefore with guide portions 117 and 117', when requiring to wind the coils with wire W delivered by needle 115.

Alignment of pieces 150 and 151 with the stator causes alignment of wire guide portions 117 and 117' with respective poles and slots where the wire W needs to be wound, like is shown in more detail with the sequences of FIGS. 16 and 17.

With particular reference to FIGS. 14 and 15, piece 150 extends along a circular path on the right side 160 of stator 10. Piece 150 is supported by shaft 170 of assembly 130. More particularly, shaft 170 is cantilevered with respect to slide 171. Slide 171 is placed at an eccentric distance XE from centre axis O and can be moved in direction T or opposite direction T' by rotation of screw 172 engaged in a threaded sleeve (not shown) assembled within slide 171. Screw 172 is rotated by pulley, belt and motor assembly 173. Consequently, slide 171 is moved in direction T or opposite direction T' so that piece 150, and therefore guide portion 117, translates in radial directions R and R' of the stator. Translation in direction T will move piece 150 and guide portion 117 in direction R, whilst translation in direction T' will move piece 150 and guide portion 117 in direction R'

Piece 151 extends along a circular path on left side 161 of stator 10. Piece 151 is supported by a shaft (not shown, although similar to shaft 170) of an assembly 131. Assembly 131 can be equipped with parts and performances similar to assembly 130, so that piece 151 and therefore guide portion 117' respectively translates in radial directions R and R' on side 100" by means of translations in direction T and T', respectively.

Frame 174 of assembly 130 for supporting screw 172 and assembly 173 can run on guides 175 to position piece 150 and guide portion 117 adjacent to or away from stator end 100, i.e. frame 174 can move towards or away from the reader observing FIG. 14.

Assembly 131 has similar members and performances to position piece 151 and guide portion 117' adjacent to or away from stator end 100".

When pieces 150 and 151 have moved away from the stator, and also support member 121 has moved away from the stator, clearance is created for moving housing 125 between pieces 150 and 151. This is required when stator 10 has to be aligned with the winding needle 115, with stator 10 that has been previously loaded in housing 125 in a location which is aside with respect to the winding position of housing 125 shown in FIGS. 14-17.

Guide portions 117 and 117' are equipped with ledge surfaces 116 and 116' extending axially away from pieces 150 and 151, respectively. This is required so that wire extending from the coil to the needle can be supported by ledge surfaces 116 and 116' in order to be aligned with areas X of the pole where the wire needs to be drawn when needle 15 is relatively moving outside stator 10 at ends 100' and 100".

In other words, guide portions 117 and 117' can be structural portions extending from pieces 150 and 151 in directions pointing away from respective ends 100 and 100' of the stator where pieces 150 and 151 are adjacent, like is shown for portions 117 and 117' in FIG. 14. Ledge surfaces 116 and 116' are thus aligned with areas X of the pole where the wire needs to be drawn by relative movement of pieces 150 and 151 in direction R and R'. This movement in direction R and R' is obtained by the movements of pieces 150 and 151 in directions T and T' produced by assemblies 130 and 131, as described in the foregoing.

FIGS. 16 and 17 show winding sequences occurring with needle 115 at end 100' and using piece 150 and wire guide 117. Similar sequences can occur with piece 151 and wire guide 117' when needle 115 is at end 100"

With reference to FIG. 16, guide portion 117 is aligned with pole 114" that is adjacent to pole 114' where the wire is being drawn to wind the coil. Edge 117a of guide portion 117 is aligned with slot 111 where the wire W needs to pass to be drawn around pole 114'. The needle has moved beyond end 100' by passing wire W through gap 120, i.e. the needle has moved in direction P towards the reader observing FIG. 15 and wire W is extending from slot 111 through gap 120. Guide portion 117 has been relatively moved in direction R to be in position for alignment of ledge surface 116 with the area of pole 114' where the wire W needs to be drawn for the particular stratification position that is required in the particular instant of coil winding. Then, (see FIG. 17), needle 115 is relatively moved in direction R to occupy position 140 to allow wire W to be drawn above ledge 116. Then, stator 10 can be rotated in direction RQ' to draw wire W out of needle 115 and above ledge surface 116. At the end of the rotation, edge 117a of guide portion 117 is aligned with the opposite slot 111' of pole 114'. Successively, needle 115 is moved back in direction R' so that it remains aligned with slot 111' in position 141, which is an alignment condition for translating the needle into the hollow space of the stator, i.e. in direction P' away from the reader observing FIG. 17 in order to draw the wire through opposite slot 111'. While moving needle 115 back in direction R', wire W becomes supported by ledge 116 and extends to needle 115 with portion WS in alignment with the opening of slot 111' (see FIG. 17). Then, needle 115 can be translated in direction P° to draw the wire around the pole. The edges of gap 120 of ring 118 will keep wire W aligned with the opening of slot 111' when the needle is translating in direction P'. At end 100", guide portion will have edge 117'a aligned with slot 111'. Therefore, at end 100" similar operations can occur with guide portion 117' and by means of opposite rotations RQ of the stator so that the wire becomes supported by ledge 116', in order to complete a turn of the coil around pole 114'.

For forming multiple turns of the coils around pole 140', pieces 150 and 151 will be displaced in directions T for predetermined increments generated by motors of assemblies like 173 of assemblies 130 and 131. As a result ledge surfaces 116 and 116' will become aligned with successive radial positions of the poles to progressively stratify the wire.

The relative movements of needle 115 in directions R and R' at end 100' and 100 can be obtained by predetermined radial movement of housing 125 in direction R and R', like has been shown for housing 25 of FIG. 1, or by predetermined movement of needle 115 in directions R and R' using motor and mechanical drives like those described in U.S. Pat. Nos. 6,533,208 and 6,622,955.

The foregoing description of specific embodiments will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. Apparatus for winding wire coils in slots located adjacent to poles of a core member of a dynamo electric machine component, comprising:
   a wire delivery member, for delivering wire to wind the wire coils by relative movement of the wire delivery member with respect to the core member along a trajectory partially located within the interior of the core member;
   a wire guide supported in predetermined positions in relation to the core for aligning the wire with the poles during winding;
   support means for supporting the wire guide, wherein said support means have a support portion occupying a support position during the relative movement of the wire delivery member to wind the wire coils;
   means for relatively moving an individual support portion in alignment with adjacent poles during winding of a coil, in synchronism with the movement of the wire delivery member, for supporting the wire guide as a function of the position of the wire delivery member;
   means for relatively moving the individual support portion for supporting the wire guide in successive alignments with differing radial positions of the pole where the wire needs to be drawn during winding of a coil; and
   means for relatively moving the wire delivery member in successive alignments with the differing radial positions of the pole where the wire needs to be drawn during winding of a coil.

2. The apparatus of claim 1 further comprising:
   a second support portion of the support means positioned in a second support position to support a second wire guide;
   means for relatively moving the second support portion in successive alignments with other differing radial positions of a pole where the wire needs to be drawn during winding of a coil; and
   means for relatively moving the wire delivery member in successive alignments with the other differing radial positions of the pole where the wire needs to be drawn during winding of a coil.

3. The apparatus of claim 2 wherein the wire guide is alternatively supported by the first support portion and the second support portion.

4. The apparatus of claim 1 wherein the means for relatively moving the support portion comprises means for moving the dynamo electric machine component in a radial direction.

5. The apparatus of claim 1 wherein the portion of the support means comprises two spaced apart members occupying the interior of said core member to support the wire guide; and wherein each of the spaced apart members provides at least one wire guide.

6. The apparatus of claim 1 wherein:
   a portion of the support means for the wire guide is supported externally to said core at one end and on one side of said core; and
   a portion of the support means for a second wire guide is supported externally to said core at a second end and on a second side of said core.

7. The apparatus of claim 1 wherein the wire delivery member relatively moves in successive alignments with the radial positions of the pole at a distance from the core end, wherein said distance is greater than a distance from the core end where the support portion moves the wire guide in successive alignments with the differing radial positions of the pole.

8. The apparatus of claim 1 wherein the wire guide is an axial extension of the support means.

9. The apparatus of claim 1 wherein the support portion of the support means is relatively moved in radial direction within the interior of the dynamo electric machine component in order to support the wire guide in successive alignments with the differing radial positions of the pole.

10. The apparatus of claim 1 wherein the support position is a position where relative translation movement of the delivery member occurs along the trajectory and is external and proximate to an end of the core member.

11. The apparatus of claim 1 wherein the wire guide is distanced from the end of the core member as a function of the space occupancy of the wire coil being formed along the core end.

12. The apparatus of claim 11 wherein the wire guide is moved to be distanced from the core end after each relative movement of the wire delivery member adjacent to the core end.

13. The apparatus of claim 11 wherein the wire guide comprises two spaced apart members that are moved to be distanced differently from the core end.

14. The apparatus of claim 1 wherein the support portion comprises a gripper assembly for clamping the wire guides at each core end.

15. The apparatus of claim 1 further comprising a shielding member aligned within said core, the shielding member being provided with spacing for passage of the wire from the wire delivery member to the slots during winding.

16. A method for winding wire coils in slots located adjacent to poles of a core member of a dynamo electric machine component, comprising the steps of:
delivering wire to wind the wire coils by relative movement of a wire delivery member with respect to the core member along a trajectory partially located within the interior of the core member;
supporting a wire guide with a portion of support means occupying a support position during winding;
moving an individual support portion in alignment with adjacent poles during winding of a coil, in synchronism with the movement of the wire delivery member, in order to support the wire guide as a function of the position of the wire delivery member;
relatively moving the individual support portion for supporting the wire guide in successive alignments with multiple differing radial positions of a pole where the wire needs to be drawn during winding of a coil; and
relatively moving the wire delivery member in successive alignments with the multiple differing radial positions of the pole where the wire needs to be drawn during winding of a coil.

17. The method of claim 16 further comprising the steps of:
providing a second portion of the support means positioned in a second support position;
relatively moving the second support portion in successive alignments with other multiple differing radial positions of a pole where the wire needs to be drawn; and
relatively moving the wire delivery member in successive alignments with the other multiple differing radial positions of the pole.

18. The method of claim 17 further comprising the step of alternatively supporting the wire guide with the first support portion or the second support portion.

19. The method of claim 16 further comprising the step of positioning the support portion at different distances from an end of the core during winding.

20. The method of claim 19 further comprising the step of increasing the distance from the end of the cores as winding progresses.

21. The method of claim 16 further comprising the step of providing a wire passage at each core end, and the wire passage being moved in synchronism with the movement of the wire delivery member.

22. The method of claim 16 further comprising the step of relatively moving the wire delivery member in successive alignments with the multiple differing radial positions of the pole at a distance from the core end that is greater than a distance from the core end where the support portion moves the wire guide in successive alignments with the multiple differing radial positions of the pole.

23. The method of claim 16 further comprising the steps of:
providing free spacing adjacent a radial extension of the support means;
aligning the wire with the radial positions by means of the radial extension; and
moving the wire through the free spacing and beyond the radial extensions when the wire delivery member is relatively translated with respect to the core.

24. The method of claim 16 further comprising the steps of:
aligning a shielding member within said core; wherein the shielding member provides a spacing for passage of the wire from the wire delivery member to the slots during winding; and
maintaining the shielding member stationary in alignment within said core when relatively moving the support portion in successive alignments with the multiple differing radial positions of the pole where the wire needs to be drawn.

* * * * *